(12) United States Patent
Loh et al.

(10) Patent No.: US 8,681,892 B2
(45) Date of Patent: Mar. 25, 2014

(54) WIRELESS COMMUNICATION METHOD, WIRELESS TRANSMITTER AND WIRELESS RECEIVER

(71) Applicant: Panasonic Corporation, Osaka (JP)

(72) Inventors: Lee Ying Loh, Singapore (SG); Katsuyoshi Naka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/920,853

(22) Filed: Jun. 18, 2013

(65) Prior Publication Data

US 2013/0279618 A1    Oct. 24, 2013

Related U.S. Application Data

(63) Continuation of application No. 13/464,189, filed on May 4, 2012, now Pat. No. 8,488,701, which is a continuation of application No. 11/994,628, filed as application No. PCT/JP2005/012347 on Jul. 4, 2005, now Pat. No. 8,194,786.

(51) Int. Cl.
*H04L 1/02* (2006.01)

(52) U.S. Cl.
USPC ........... 375/267; 375/316; 375/340; 375/346; 375/347; 375/349; 375/260; 375/285; 375/259

(58) Field of Classification Search
USPC ......... 375/316, 340, 346, 347, 349, 260, 267, 375/285, 259
See application file for complete search history.

(56) References Cited

U.S. PATENT DOCUMENTS

| | | | |
|---|---|---|---|
| 5,852,630 | A | 12/1998 | Langberg et al. |
| 6,985,434 | B2 | 1/2006 | Wu et al. |
| 7,392,460 | B2 | 6/2008 | Kim et al. |
| 7,697,625 | B2 | 4/2010 | Kim et al. |
| 7,706,347 | B2 | 4/2010 | Kim et al. |
| 2003/0198282 | A1 | 10/2003 | Tujkovic et al. |
| 2004/0062221 | A1 | 4/2004 | Gopalakrishnan et al. |
| 2004/0268206 | A1 | 12/2004 | Kim et al. |
| 2005/0135321 | A1 | 6/2005 | Sharony |
| 2005/0276317 | A1 | 12/2005 | Jeong et al. |
| 2006/0098754 | A1 | 5/2006 | Kim et al. |

(Continued)

FOREIGN PATENT DOCUMENTS

| | | |
|---|---|---|
| EP | 1 404 048 A1 | 3/2004 |
| EP | 1 482 667 A2 | 12/2004 |
| JP | 2004-135304 A | 4/2004 |
| WO | 2004/049613 A2 | 6/2004 |

OTHER PUBLICATIONS

Chae et al., "Adaptive Spatial Modulation for MIMO-OFDM," Wireless Communications and Networking Conference, vol. 1: 87-92, Mar. 21-25, 2004.

(Continued)

*Primary Examiner* — Siu Lee
(74) *Attorney, Agent, or Firm* — Seed IP Law Group PLLC

(57) ABSTRACT

A wireless communication method by which unnecessary retransmission request is suppressed and feedback information is reduced at the same time in a MIMO communication system. The wireless communication method is provided for transmitting signals by using a plurality of antennas, and has a step of applicably selecting the group configuration of the antennas, and a step of adding data to be used for error detection to a signal to be transmitted by using the antennas, by following the results of the selection.

24 Claims, 12 Drawing Sheets

(56) References Cited

U.S. PATENT DOCUMENTS

2006/0128309 A1 6/2006 Dateki et al.
2006/0264184 A1 11/2006 Li et al.
2008/0123583 A1 5/2008 Shiizaki et al.

OTHER PUBLICATIONS

International Search Report, mailed Sep. 6, 2005, for corresponding International Application No. PCT/JP2005/012347, 2 pages.
Notice of the Reasons for Rejections, dated Aug. 13, 2010, for corresponding Japanese Application No. 2007-523307, 6 pages. (with English Translation).
Proakis, Digital Communication, Fourth Edition, Aug. 15, 2000, p. 453.
Zheng et al., "Multiple HARQ Processes for MIMO Systems," IEEE Symposium on Personal, Indoor, and Mobile Radio Communications, 2002, 4 pages.
Zheng et al., "Multiple ARQ Processes for MIMO Systems," EURASIP Journal on Applied Signal Processing 5:772-782, 2004.
European Search Report, dated Jul. 3, 2013, for corresponding European Application No. 057652547-1852/1901466, 3 pages.

WIRELESS COMMUNICATION METHOD, WIRELESS TRANSMITTER AND WIRELESS RECEIVER

BACKGROUND

1. Technical Field

The present invention relates to a wireless communication system, wireless transmitting apparatus and wireless receiving apparatus used in a MIMO (Multiple Input Multiple Output) communication system.

2. Description of the Related Art

Simultaneous transmission of multiple data streams is carried out in a MIMO communication system that employs multiple ($N_T$) transmitting antennas and multiple ($N_R$) receiving antennas. Signals travel from the transmitting antennas via a plurality of paths, undergoing reflection and scattering before arriving at the receiving antennas. A key feature of MIMO systems is the ability to exploit multipath propagation, turning it into a benefit for the user. One such advantage is the increase of system capacity through the use of spatial multiplexing, typically achieved by transmitting independent data on individual transmit links.

With future technology shifting to accommodate a high speed, more IP-based data service, requirements such as spectral efficiency, system user capacity, end-to-end latency, and quality of service management, need to be satisfied. One of the techniques that play a crucial part in meeting some of these criteria is automatic repeat request (ARQ). ARQ is useful for ensuring fast and reliable delivery.

ARQ is a technique for sending a retransmission request for received packet data upon detection of an error in the received packet data. With the transfer of a large amount of high-speed data, more efficient ARQ techniques are typically used to reduce the number of retransmission requests.

In a typical implementation of ARQ, each packet is associated with CRC (Cyclic Redundancy Check) for the purpose of error detection. At the receiver, the content of each packet is validated through the use of CRC. If the packet content is found to contain errors, the receiver will request a retransmission. In the case of MIMO systems, single CRC data (hereinafter "single CRC") is simply attached to a packet and this packet is sent using multiple antennas. Since substreams transmitted from different antennas normally experience different link conditions, these antennas have different error statistics. The probability that signals on all antennas have errors is very small, especially when a large number of antennas are employed. Since only single CRC is used, the whole packet has to be retransmitted if errors are detected. Therefore, substreams that have already been correctly received are retransmitted, and throughput is wasted beyond necessity.

A method of reducing unnecessary retransmission is proposed in Non-Patent Document 1. The method proposed makes use of encoders per antenna which make ARQ processes performed in each substream. Using multiple encoders per antenna, it is possible to eliminate the constraint of sharing single ARQ processing by multiple transmitting antennas, and multiple acknowledgement signals are sent back to the transmitter which decides whether to retransmit the substreams in error. Hence, throughput can be increased significantly, and error-free substreams need not to be retransmitted.

Non Patent Document 1: "Multiple ARQ Processes for MIMO systems", the IEEE International Symposium on Personal, Indoor and Mobile Radio Communications 2002.

BRIEF SUMMARY

Problems to be Solved by the Invention

Although using only single CRC for multiple antennas causes unneeded retransmission when received signals from only one or two antennas are found to contain errors, the employment of multiple ARQ processes using multiple CRC data {hereinafter "multi-CRC") can solve this problem. However, ARQ processes using multi-CRC causes an increase of uplink signaling overheads due to multiple acknowledgements (that is, feedback information) and this needs to be considered, especially when the number of antennas to be used is large. That is, in the ARQ system of related art, it is difficult to control unneeded retransmission and reduce feedback information.

it is therefore an object of the present invention to provide a wireless communication system, wireless transmitting apparatus and radio receiving apparatus that can control unnecessary retransmission in a MIMO system and reduce feedback information.

Means for Solving the Problem

The wireless communication method of the present invention for transmitting a signal using multiple antennas employs a configuration having: a selecting step of adaptively selecting a group configuration of the multiple antennas; and an attaching step of attaching data used in error detection to a signal to be transmitted using the multiple antennas according to a result of selection.

The wireless transmitting apparatus of the present invention employs a configuration having: multiple antennas; a selecting section that adaptively performs selection of the multiple antennas; an attaching section that attaches data used in error detection to a signal to be transmitted using the multiple antennas according to a result of selection by the selection section; and a transmitting section that transmits the signal with the data attached by the attachment section.

The wireless receiving apparatus of the present invention having: multiple antennas; a receiving section that receives through the multiple antennas a signal to which data used in error detection is attached according to the result of selection of the group configuration of the multiple antennas; and a detecting section that performs error detection on the signal received by the receiving section using the data attached to the signal.

Advantageous Effect of the Invention

According to the present invention, it is possible to control unnecessary retransmission and reduce feedback information in a MIMO system.

DETAILED DESCRIPTION

An embodiment of the present invention will be described in detail below with reference to the accompanying drawings.

Figure 1A:
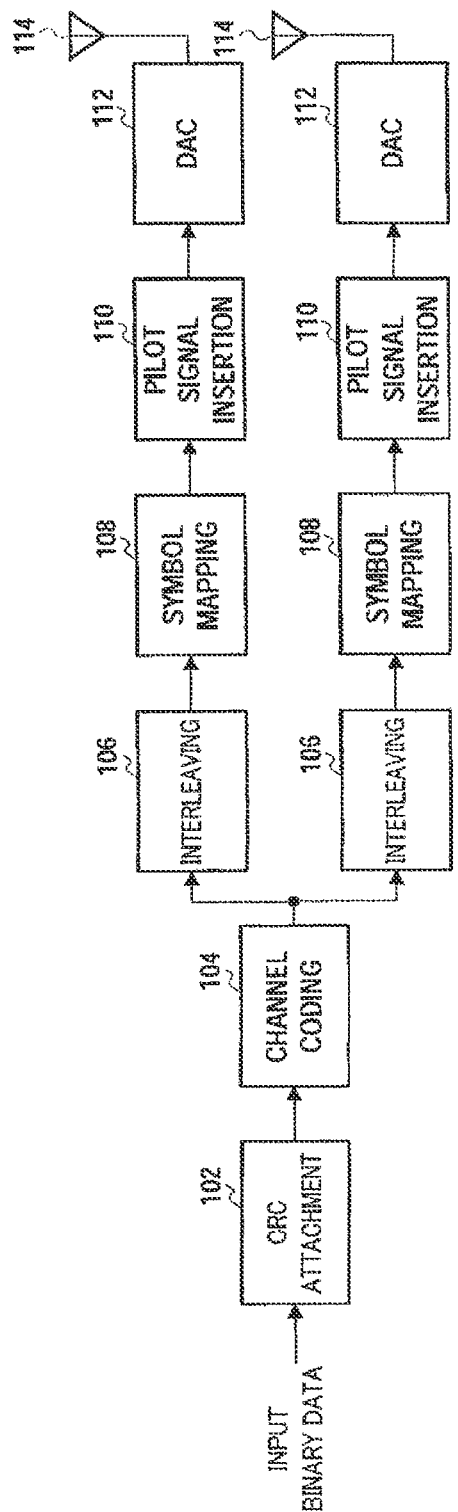
FIG. 1A illustrates an example of a configuration of a transmitter in which single CRC is attached.
Figure 1B:
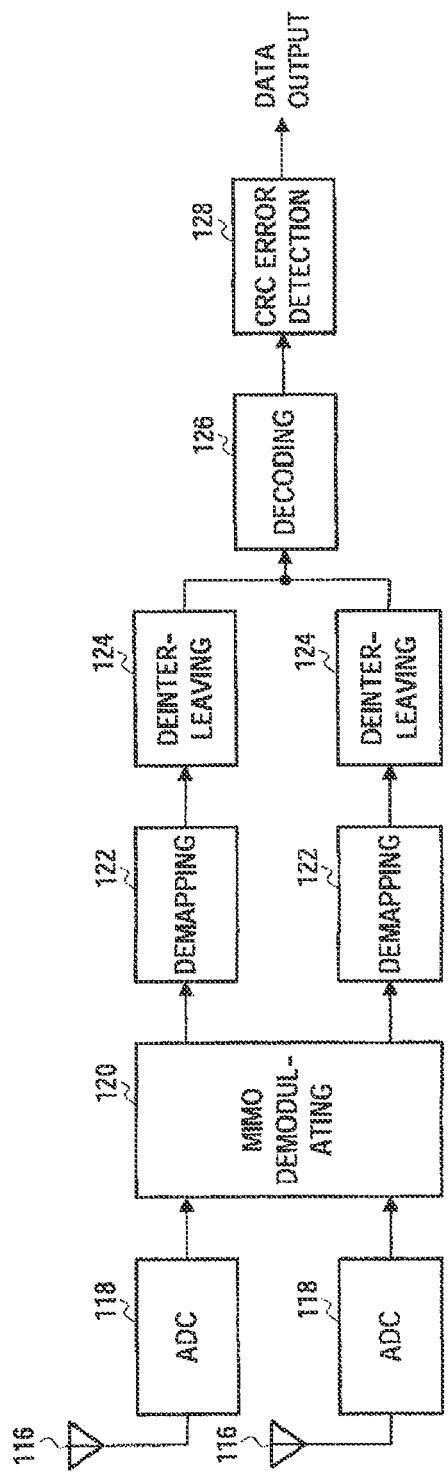
FIG. 1B illustrates an example of a configuration of a receiver in which error detection is performed by single CRC.

FIGS. 1A and 1B are diagrams of a MIMO wireless communication system in which single CRC is attached. FIG. 1A illustrates the configuration of a transmitter, and FIG. 1B illustrates the configuration of a receiver.

Referring to FIG. 1A, at the transmitter, data processing is performed for a single stream of information, regardless of the number of antennas present. First, CRC attachment 102 is performed on inputted binary data, and channel coding 104 (such as convolutional coding and turbo coding) is carried out on the binary data. The encoded data will then be multiplexed into a plurality of streams to be transmitted through the various antennas, and interleaving 106 is performed on streams on respective antennas so as to reduce burst errors in the data. Symbol mapping 108 is carried out on the interleaved data using multiple amplitudes and multiple constellations. Pilot signal insertion 110 will be performed for performing channel estimation at the receiver.

Prior to transmission, the digital signal is converted to analog signal by digital to analog converter (DAC) module 112. After the above processing, signals will be ready for transmission through their allocated transmitting antenna 114.

Referring to FIG. 1B, at the receiver, the reverse processing to the above-described processing, like analog to digital conversion by analog to digital conversion (ADC) 118, is performed on the signal received at receiving antennas 116. Since a received signal includes overlapping signals from multiple transmitting antennas 114, it is necessary to separate the received signal into individual streams. This separating processing is performed through the use of MIMO demodulating 120, such as inverse channel matrix, maximum likelihood detection or V-BLAST technique.

Further, after demapping 122 and deinterleaving 124, the data will be demultiplexed into the original packet size, and decoding 126 will be performed on the packet. Finally, CRC error detection 128 is carried on the packet to validate the data. If the packet checked is decided to be error free, an ACK (acknowledgement) is sent to the transmitter, and the transmitter will not retransmit the packet. By contrast, a NACK (negative acknowledgment) is sent to the transmitter in order to request retransmission.

Figure 2A:
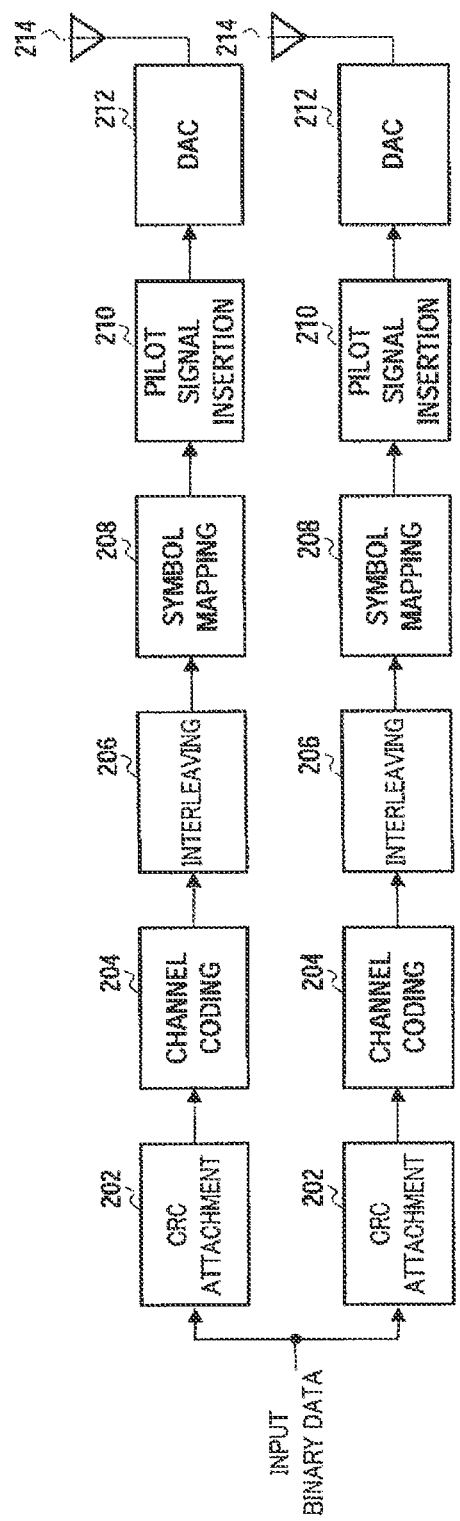
FIG. 2A illustrates an example of a configuration of a transmitter in which multi-CRC is attached.
Figure 2B:
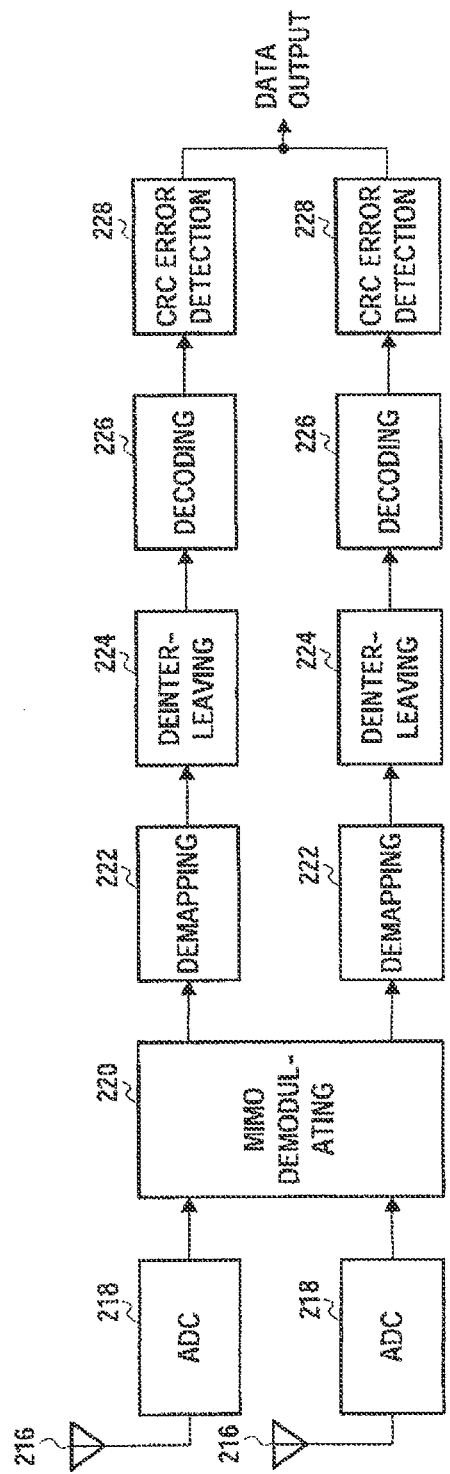
FIG. 2B illustrates an example of a configuration of a receiver in which error detection is performed by multi-CRC.

FIGS. 2A and 2B illustrate a MIMO wireless communication system within which multi-CRC technique is applied. FIG. 2A shows the configuration of a transmitter, and FIG. 2B shows the configuration of FIG. 2B.

Referring to FIG. 2A, interleaving 206, symbol mapping 208, pilot signal insertion 210, DAC 212 and transmitting antenna 214 in this transmitter are the same as interleaving 106, symbol mapping 108, pilot signal insertion 110, DAC 112 and transmitting antenna 114 shown in FIG. 1A, respectively. The transmitter of FIG. 2A differs from that of FIG. 1A in that the transmitter of FIG. 2A includes multiple CRC attachment 202 grid multiple channel encoding 204.

This means that every data packet on each individual receive antenna chain will undergo CRC error detection for error detection. Receiving antennas 216, ADC 218, MIMO demodulating 220, demapping 222 and deinterleaving 224 in this receiver is the same as receiving antenna 116, ADC 118, MIMO demodulating 120, demapping 122 and deinterleaving 124 shown in FIG. 1B, respectively. The receiver of FIG. 2B differs from that of FIG. 1B in that the receiver of FIG. 2 has multiple decoding 226 and multiple CRC error detection 228.

The receiver will then feedback ARQ information for each of the data streams via a fast ARQ feedback channel to the transmitter. Advantages of this configuration include that it eliminates the need to retransmit the data from all antennas whenever an error is detected. Only those data streams that are corrupted require retransmission. The probability that all data streams have errors is low, so that this transmission method can improve the data throughput.

Figure 3A:
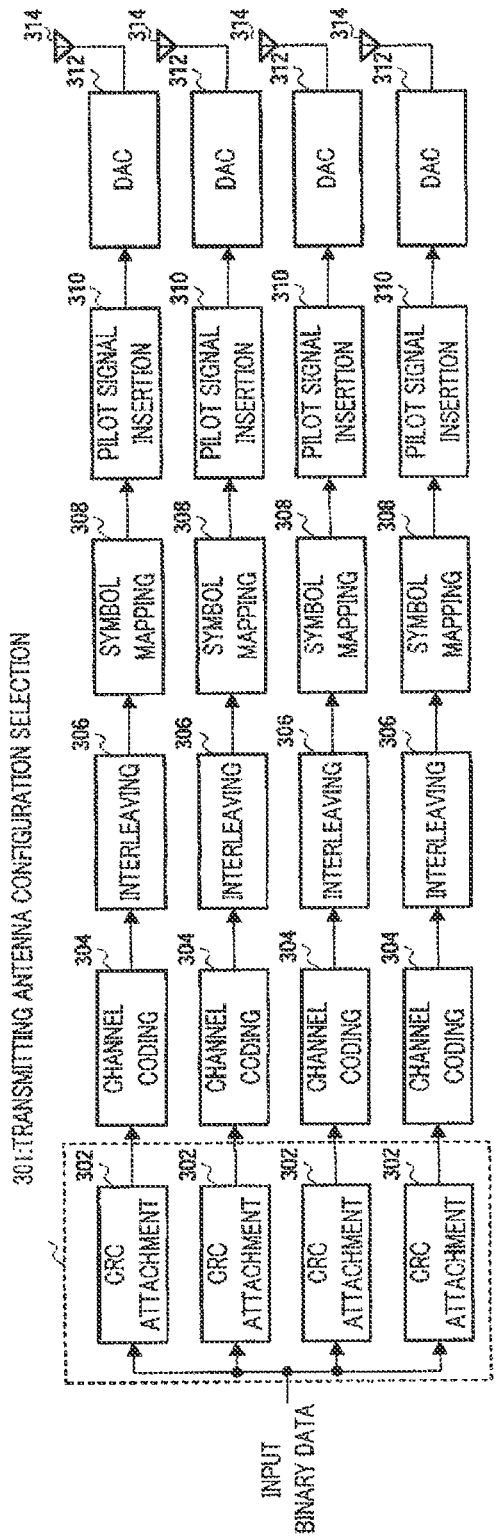
FIG. 3A illustrates a configuration of a transmitter according to an embodiment of the present invention.
Figure 3B:
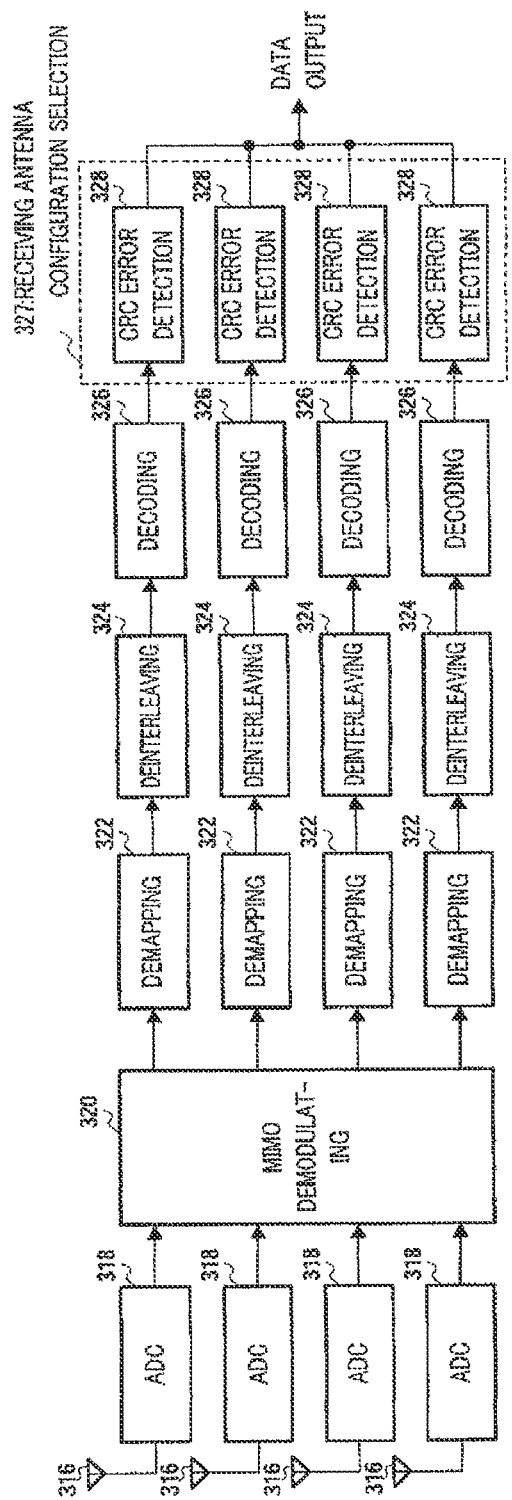
FIG. 3B illustrates a configuration of a receiver of an embodiment according to the present invention.

FIGS. 3A and 3B illustrate MIMO wireless communication system according to an embodiment of the present invention. FIG. 3A illustrates the configuration of a transmitter, and FIG. 3B illustrates the configuration of a receiver. Further, in this case, although a transmitter and a receiver each having four antennas will be described for ease of explanation, the number of antennas of the transmitter and the number of antennas of the receiver according to the present invention are not limited to four. A transmitter and receiver applied to the present invention may have multiple antennas forming MIMO channel.

The transmitter of FIG. 3A has transmitting antenna configuration selection 301, CRC attachment 302, channel encoding 304, interleaving 306, symbol mapping 308, pilot signal insertion 310, DAC 312 and transmitting antenna 314. Channel encoding 304, interleaving 306, symbol mapping 308, pilot signal insertion 310, DAC 312 and transmitting antenna 314, which configure a transmitting section that performs signal transmission, are the same as channel encoding 204, interleaving 206, symbol mapping 208, pilot signal insertion 210, DAC 212 and transmitting antenna 214 of the above-described transmitter, respectively. Although the operation of CRC attachment 302 is basically the same as CRC attachment 202, the operation is controlled by transmitting antenna configuration selection 301. The transmitting antenna configuration selection 301 will be described later.

The receiver of FIG. 3B has receiving antenna 316, ADC 318, MIMO demodulating 320, demapping 322, interleaving 324, decoding 326, receiving antenna configuration selection 327 and CRC error detection 328. Receiving antenna 316, ADC 318, MIMO demodulating 320, demapping 322, deinterleaving 324 and decoding 326, which configure a receiving section that performs signal reception, are the same as receiving antenna 216, ADC 218, MIMO demodulating 220, demapping 222, deinterleaving 224 and decoding 226 of the above-described receiver, respectively. Although the operation of CRC error detection 324 is basically the same as CRC error detection 228, the operation is controlled by receiving antenna configuration selection 327. Receiving antenna configuration selection 327 will be described later.

Transmitting antenna configuration selection 301 will be described below.

Figure 4A:
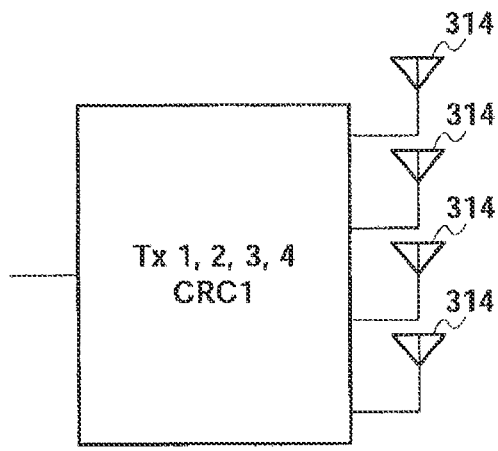
FIG. 4A illustrates an antenna configuration of an embodiment according to the present invention.
Figure 4B:
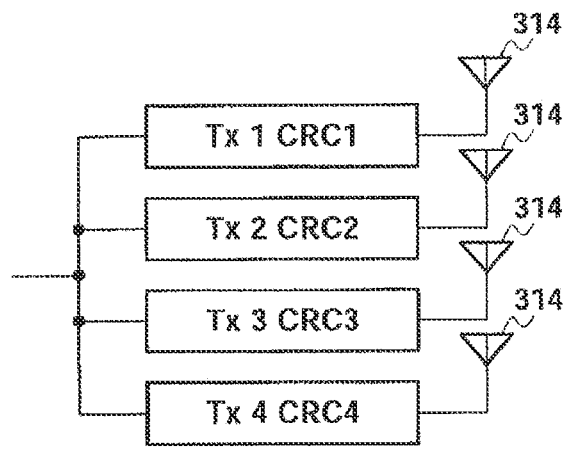
FIG. 4B illustrates another antenna configuration according to an embodiment of the present invention.
Figure 4C:
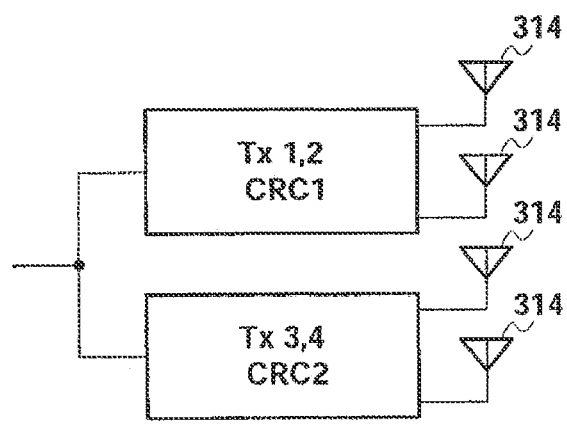
FIG. 4C illustrates another antenna configuration according to an embodiment of the present invention.

FIGS. 4A, 4B and 4C illustrate an example of antenna configurations provided by the present invention, that is, an example of antenna configurations selected by transmitting antenna configuration selection 301.

FIG. 4A shows the type I configuration, which is the system that has been described using FIGS. 1A and 1B. In this configuration, single CRC is attached to the data packet regardless of the number of antennas present. The advantage of employing this type of configuration is that the size of the packet undergoing channel coding will become larger. A longer code usually can help reduce an error rate as compared to a shorter code.

FIG. 4B shows the type II configuration, which is the system that has been described using FIGS. 2A and 2B. In this configuration, CRC data is attached on each packet on different antenna chain. By doing so, it ensures fast response for ARQ as only antenna streams where error occurs need to be retransmitted. In this way, the overall throughput can increase significantly.

FIG. 4C shows the type III configuration. This configuration is a combination of type I and II configurations. This type aims to achieve a balance to obtain a low error rate and reduce the latency. Other advantages include reducing the signaling overheads required for multi-CRC and controlling the reduction of unnecessary retransmission together.

Several criteria can be applied when a configuration is selected from the three antenna configurations. One is to select the transmission type according to quality of service (QoS) requirement. Other criteria include selection based on ARQ feedback information, channel feedback information or the employed modulation and coding scheme (MCS).

The first preferred embodiment of the present invention describes antenna configuration selection according to QoS requirements. For meeting the end-user QoS requirements for various applications, a system would need to support the configuration of a flexible set of traffic classes with different latency and packet error rate performance.

The present invention can support different sets of traffic classes, which mainly encompass two main types of requirements related to QoS. The system has to meet either low error rates or low latency requirement. For systems that require low latency, transmission of a large amount of data is frequently required in a short time while accuracy takes second place. Some examples of such applications include video streaming and fax.

On the other hand, for systems requiring lower error rates than a certain rate, the accuracy of data is the most important factor. These applications include e-commerce, web browsing, email access and other interactive services such as instant messaging.

Therefore, when antenna configuration selection is performed according to QoS requirements, it will be suitable to assign type I configuration for systems requiring low error rates and type II configuration to systems requiring low latency. Since error-intolerant but delay-tolerant systems do not request fast ARQ response, it is not necessary to employ multi-CRC. Instead, single CRC should be employed by the system in order to minimize the error rate by maximizing the coding length. In this way, the number of retransmissions needed can also be reduced. By contrast, for delay-intolerant but error-tolerant systems, fast ARQ response may be required. Hence, by employing multi-CRC, unnecessary retransmission can be eliminated since only corrupted streams are retransmitted.

For the type III configuration, there are several ways of grouping antennas and these ways will depend on ARQ information feedback to the transmitter. Using ARQ ACK/HACK information as a broad criterion, the quality of the antennas can be estimated. An antenna that does not require retransmission for its data will be deemed to be of better quality as compared to an antenna that requires retransmission. In this case, the method of grouping will depend on the quality of these antennas.

Figure 5:
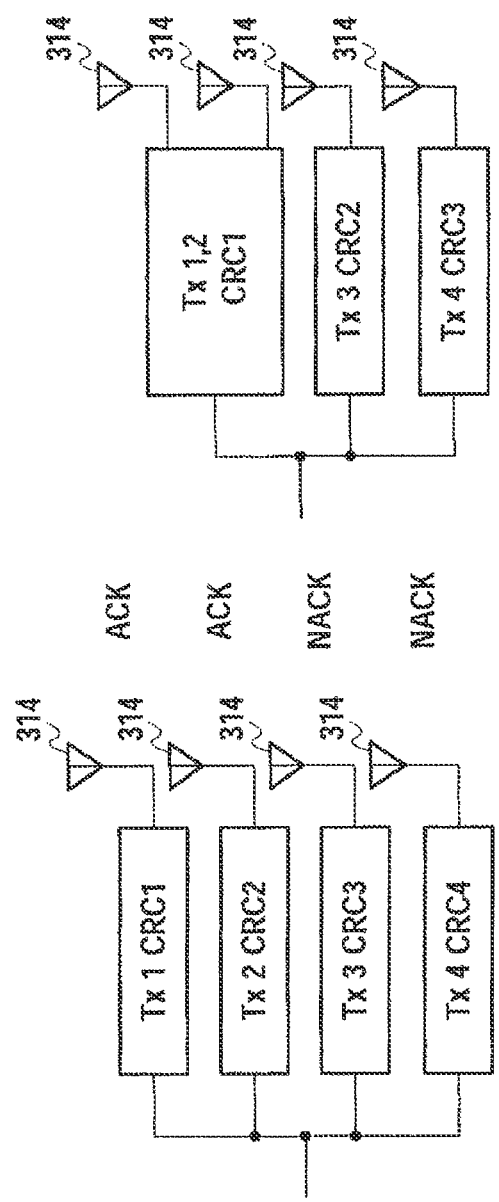
FIG. 5 illustrates a first example of antenna configuration selection upon retransmission according to an embodiment of the present invention.

As shown in FIG. 5, the type II configuration has been chosen for the current transmitted packet. For the selection of the transmission method for the next packet, antennas $T_{x1}$, and $T_{x2}$ can be grouped together since the probability of these two antennas requiring retransmission is not high. On the other hand, those antennas which are more prone to retransmission will continue to employ multi-CRC technique. The aim of employing this type of transmission is to reduce the overheads caused by ARQ feedback from all the antennas as compared to type II configuration. The type III configuration is best suited for QoS requirements that do not have tight constrains such as a low error rate and low latency.

Figure 6:
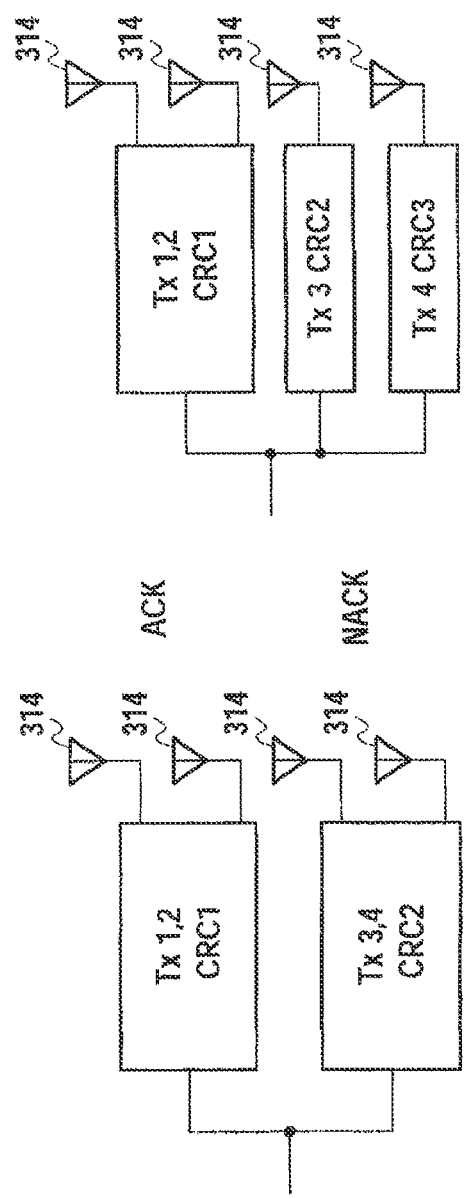
FIG. 6 illustrates a second example of antenna configuration selection upon retransmission according to an embodiment of the present invention.
Figure 7:
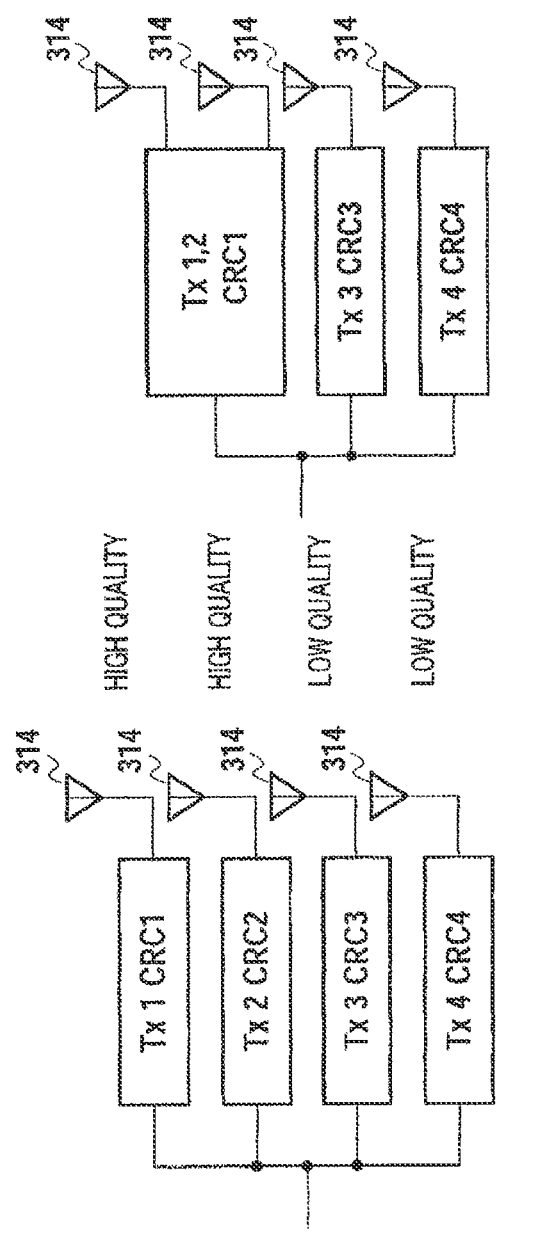
FIG. 7 illustrates a third example of antenna configuration selection upon retransmission according to an embodiment of the present invention.

On the other hand, if the system already employs type I or type III transmission as in FIG. 6, and errors occur for a particular antenna group, the antenna configuration is selected so that the particular antenna group is divided into smaller groups of antennas, and single CRC can be used for the divided groups of antennas, upon the next retransmission. By dividing the antennas into smaller groups, it is possible to reduce unnecessary retransmission and lower the latency.

In a second preferred embodiment of the present invention, the selection of antenna configuration is performed according to ARQ feedback information received at the transmitter. The transmitter will collect ARQ feedback information and obtain long term ARQ statistics. Type I is chosen if the long term ARQ statistics show lower rate of retransmission than a predetermined value, since the increase in throughput will not be significant if multi-CRC is employed when the rate of retransmission is low. By using type I configuration, processing at both the transmitter and receiver can be reduced.

However, if the long term ARQ feedback shows a higher rate of retransmission than a predetermined value, type I or type III should be chosen. In this way, retransmission can be handled easily and can proceed more efficiently. Those antennas with high long-term error performance should have single CRC attached to a packet on each antenna for performing more efficient ARQ.

In the third preferred embodiment of the present invention, the selection of antenna configuration is performed according to channel quality feedback information received at the transmitter. In a typical closed-loop feedback system, the receiver usually provides the transmitter with some particular form of channel information for adaptation purposes. For MIMO systems, the MIMO channel quality can be determined if channel statistics are obtained by the receiver. From these statistics, the quality of each antenna can be known.

If all the antennas are known to be higher quality than a predetermined value, type I configuration should be applied. That is, single CRC is added to data to be transmitted from these antennas. The reason is that high quality antennas will have a lower probability of requiring retransmission and employment of type I configuration will reduce the amount of estimation processing needed.

On the other hand, if all the antennas are found to be lower quality than a predetermined value, type II configuration should be assigned since the probability of requiring retransmission for such antennas is high. Type II configuration will improve retransmission efficiency which will in turn increase the overall throughput significantly.

In the case where both high and low quality antennas exist as shown in FIG. 1, type III configuration should be employed. Similar to the earlier cases, high quality antennas are grouped together and single CRC is attached to each packet to he sent from these antennas, while low quality antennas will have CRC data attached to each packet per antenna.

In the fourth embodiment of the present invention, the selection of antenna configuration is performed according to MCS employed by the system. For a system using lower MCS level than a predetermined value (for example, a system with low-level M-ary number modulation scheme QPSK and low coding rate ⅓), type I configuration is assigned. Since the data rate for such a system will be low, the possibility of retransmission request is low. Therefore, employing type I configuration is appropriate.

For a system using higher MCS level than a predetermined value (for example, high-level modulation scheme 16 QAM and high coding rate ¾), type II configuration should be employed. Since such a system has a high data rate, the possibility of retransmission is high. Hence, type II configuration can help the efficiency of retransmission improve.

Figure 8:
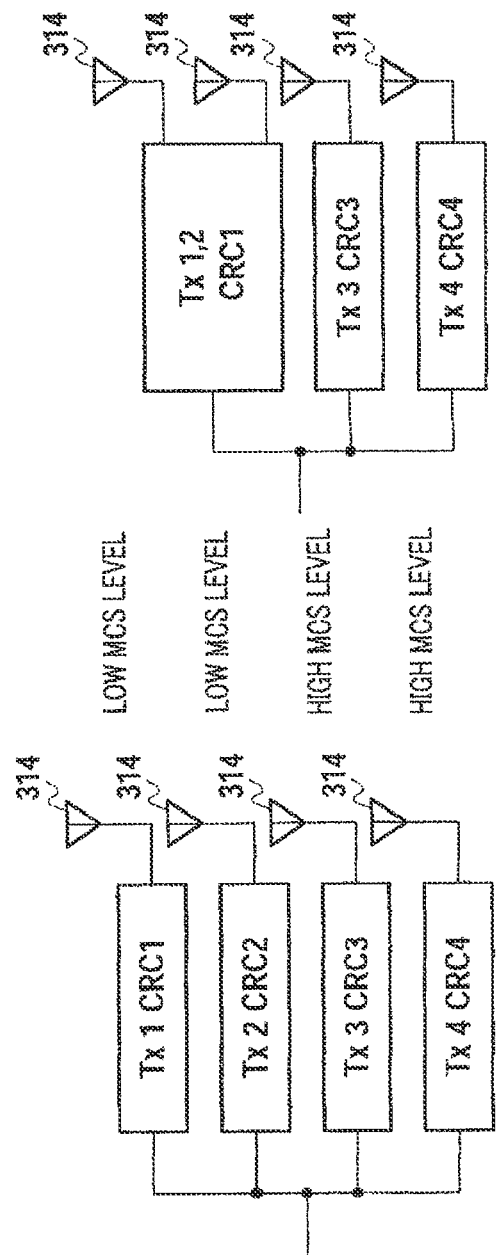
FIG. 8 illustrates a fourth example of antenna configuration selection upon retransmission according to an embodiment of the present invention.

However, if the system employs a different MCS level with respect to each antenna as illustrated in FIG. 8, for example, if higher MCS level than a predetermined value is used for one of antennas and lower MCS level than the certain value is used for one of the other antennas, antennas transferring at a low data rate should be grouped together and a single CRC is employed for the group. On the other hand, those antennas transmitting at a high data rate will employ a multi-CRC configuration. Such a flexible type III configuration can ensure adaptability, optimization of resources of the system and optimization of performance of the system.

In the present embodiment, the operation of receiving antenna configuration selection 327 of receiver completely corresponds to that of transmitting antenna configuration selection 301 of the above-described transmitter. For example, if type I configuration is selected by transmitting antenna configuration selection 301, type I configuration is selected by receiving antenna configuration selection 327. If type II configuration is selected by transmitting antenna configuration selection 301, type II configuration is selected by receiving antenna configuration selection 327. If type III configuration is selected by transmitting antenna configuration selection 301, type III configuration is selected by receiving antenna configuration 327. If type III configuration is selected, details of configurations of the transmitting side and receiving side are the same.

A result at transmitting antenna configuration antenna 301 may be reported from the transmitting side to the receiving side so as to correspond the result of antenna configuration selection at transmitting side to the result of antenna configuration selection at receiving side. Further, if transmitting antenna configuration selection is performed at the receiving side, the selection result may be reported from the receiving side to the transmitting side.

Those skilled in the art will recognize that the present invention discloses a number of modifications, within the breadth and scope of the present inventive concepts. Although the foregoing described is considered the preferred embodiment of the present invention, it is understood that various modifications may be made therein and that the invention may be implemented in various forms and embodiments. Thus, the breadth and scope of the invention should not be limited to the embodiment disclosed and should be determined by reference to the claims hereinafter provided and their equivalents.

INDUSTRIAL APPLICABILITY

The wireless communication method, wireless transmitting apparatus and receiving apparatus of the present invention are suitable for MIMO communication systems.

The invention claimed is:
1. A mobile station comprising:
a receiver configured to:
select a receiving mode from a plurality of receiving modes including at least a first receiving mode and a second receiving mode; and
receive spatially multiplexed signals; and
a decoder configured to:
in a case of selection of the first receiving mode, demultiplex the received spatially multiplexed signals which include a first signal of the first receiving mode generated from a first code word with a first cyclic redundancy check (CRC) attached thereto and a second signal of the first receiving mode generated from a second code word with a second CRC attached thereto;
in a case of selection of the second receiving mode, demultiplex the received spatially multiplexed signals which include a first signal and a second signal of the second receiving mode generated from a first code word with a first CRC attached thereto and a third signal of the second receiving mode generated from a second code word with a second CRC attached thereto; and
decode signals demultiplexed in the selected receiver mode.

2. The mobile station of claim 1 wherein the receiver comprises a plurality of antennas configured to receive spatially multiplexed signals.

3. The mobile station of claim 2 wherein the receiver is configured to select an antenna configuration based on the selected receiver mode.

4. The mobile station of claim 1 wherein, in the case of selection of the second receiver mode,
the received spatially multiplexed signals include a fourth signal of the second receiver mode generated from the second code word; and
the decoder is configured to demultiplex spatially multiplexed signals of the first signal, the second signal, the third signal, and the fourth signal of the second receiver mode.

5. The mobile station of claim 1 wherein, in the case of selection of the second receiver mode,
the received spatially multiplexed signals include a fourth signal of the second receiver mode generated from a third code word with a third CRC attached thereto; and
the decoder is configured to demultiplex spatially multiplexed signals of the first signal, the second signal, the third signal and the fourth signal of the second transmission mode.

6. The mobile station of claim 1 wherein the plurality of receiver modes include a third receiver mode and, in a case of selection of the third receiver mode, the decoder is configured to:

demultiplex spatially multiplexed signals which include first and second signals of the third receiver mode generated from a first code word with a first CRC attached; and decode spatially multiplexed signals of the first signal and the second signal of the third transmission mode.

7. The mobile station of claim 6 wherein the plurality of transmission modes include a fourth receiver mode and, in a case of selection of the fourth receiver mode, the decoder is configured to:

demultiplex spatially multiplexed signals which include first and second signals of the fourth receiver mode generated from a first code word with a first CRC attached, third and fourth signals of the fourth receiver mode generated from a second code word with a second CRC attached; and decode spatially multiplexed signals of the first signal, the second signal, the third signal and the fourth signal of the fourth receiver mode.

8. A receiving apparatus, comprising:

a receiver configured to:

select a receiver mode of a plurality of receiver modes; and receive spatially multiplexed signals; and a decoder configured to in a case of selection of a first receiving mode, demultiplex the received spatially multiplexed signals which include first, second, third and fourth signals of the first receiver mode generated from a first code word of the first receiver mode with a first cyclic redundancy check (CRC) attached;

in a case of selection of the second receiving mode, demultiplex the received spatially multiplexed signals which include first and second signals of the second receiver mode generated from a first code word of the second mode with a first CRC attached, and third and fourth signals of the second receiver mode generated from a second code word of the second receiver mode with a second CRC attached; and decode signals demultiplexed in the selected receiver mode.

9. The receiving apparatus of claim 8 wherein the first code word of the first receiving mode is a different code word as the first code word of the second receiving mode.

10. A receiving apparatus, comprising:

a receiver configured to:

select a receiver mode of a plurality of receiver modes; and receive spatially multiplexed signals; and a decoder configured to in a case of selection of a first receiver mode of the plurality of receiver modes, demultiplex the received spatially multiplexed signals which include first, second, third and fourth signals of the first receiver mode generated from a first code word of the first receiver mode with a first cyclic redundancy check (CRC) attached;

in a case of selection of a second receiver mode of the plurality of receiver modes, demultiplex the received spatially multiplexed signals which include first and second signals of the second receiver mode generated from a first code word of the second receiver mode with a first CRC attached, a third signal of the second receiver mode generated from a second code word of the second receiver mode with a second CRC attached, and a fourth signal of the second receiver mode generated from a third code word with a third CRC attached; and decode signals demultiplexed in the selected receiver mode.

11. A method, comprising:

selecting a receiving mode from a plurality of receiving modes including at least a first receiving mode and a second receiving mode;

in a case of selection of the first receiving mode, demultiplexing received spatially multiplexed signals which include a first signal of the first receiving mode generated from a first code word with a first cyclic redundancy check (CRC) attached thereto and a second signal of the first receiving mode generated from a second code word with a second CRC attached thereto;

in a case of selection of the second receiving mode, demultiplexing the received spatially multiplexed signals which include a first signal and a second signal of the second receiving mode generated from a first code word with a first CRC attached thereto and a third signal of the second receiving mode generated from a second code word with a second CRC attached thereto; and decoding signals demultiplexed in the selected receiving mode.

12. The method of claim 11, further comprising selecting a configuration of a plurality of antennas based on the selected receiving mode.

13. The method of claim 11 wherein, in the case of selection of the second receiving mode, the received spatially multiplexed signals include a fourth signal of the second receiving mode generated from the second code word; and the demultiplexing spatially multiplexed signals includes demultiplexing of the first signal, the second signal, the third signal, and the fourth signal of the second receiver mode.

14. The method of claim 11 wherein, in the case of selection of the second receiving mode, the received spatially multiplexed signals include a fourth signal of the second receiver mode generated from a third code word with a third CRC attached thereto; and the demultiplexing spatially multiplexed signals includes demultiplexing of the first signal, the second signal, the third signal, and the fourth signal of the second receiving mode.

15. The method of claim 11 wherein the plurality of receiving modes include a third receiving mode and, in a case of selection of the third receiving mode, the method comprises demultiplexing the received spatially multiplexed signals which include first and second signals of the third receiving mode generated from a first code word with a first CRC attached.

16. The method of claim 15 wherein the plurality of receiving modes include a fourth receiving mode and, in a case of selection of the fourth receiving mode, the method comprises demultiplexing the received spatially multiplexed signals which include first and second signals of the fourth receiving mode generated from a first code word of the fourth receiving mode with a first CRC attached, and third and fourth signals of the fourth receiving mode generated from a second code word of the fourth receiving mode with a second CRC attached.

17. The method of claim 16 wherein the first code word of the fourth receiving mode is a different code word as the first code word of the first and second receiving modes.

18. A method, comprising:
- selecting a receiving mode from a plurality of receiving modes;
- in a case of selection of a first receiving mode of the plurality of receiving modes, demultiplexing received spatially multiplexed signals which include first, second, third and fourth signals of the first receiving mode generated from a first code word with a first cyclic redundancy check (CRC) attached;
- in a case of selection of a second receiving mode of the plurality of receiving modes, demultiplexing received spatially multiplexed signals which include first and second signals of the second receiving mode generated from a first code word of the second receiving mode with a first CRC attached, and third and fourth signals of the second receiving mode generated from a second code word of the second receiving mode with a second CRC attached; and
- decoding signals demultiplexed in the selected receiving mode.

19. A method, comprising:
- selecting a receiving mode from a plurality of receiving modes;
- in a case of selection of a first receiving mode of the plurality of receiving modes, demultiplexing received spatially multiplexed signals which include first, second, third and fourth signals of the first receiving mode generated from a first code word with a first cyclic redundancy check (CRC) attached;
- in a case of selection of a second receiving mode of the plurality of receiving modes, demultiplexing received spatially multiplexed signals which include first and second signals of the second receiving mode generated from a first code word of the second receiving mode with a first CRC attached, a third signal of the second receiving mode generated from a second code word with a second CRC attached and a fourth signal of the second receiving mode generated from a third code word of the second receiving mode with a third CRC attached; and
- decoding signals demultiplexed in the selected receiving mode.

20. A non-transitory memory medium whose contents configure a receiving apparatus to perform a method, the method comprising:
- selecting a receiving mode from a plurality of receiving modes including at least a first receiving mode and a second receiving mode;
- in a case of selection of the first receiving mode, demultiplexing received spatially multiplexed signals which include a first signal of the first receiving mode generated from a first code word with a first cyclic redundancy check (CRC) attached thereto and a second signal of the first receiving mode generated from a second code word with a second CRC attached thereto;
- in a case of selection of the second receiving mode, demultiplexing received spatially multiplexed signals which include a first signal and a second signal of the second receiving mode generated from a first code word with a first CRC attached thereto and a third signal of the second receiving mode generated from a second code word with a second CRC attached thereto; and
- decoding signals demultiplexed in the selected receiving mode.

21. The non-transitory memory medium of claim 20 wherein, in the case of selection of the second receiving mode,
- the received spatially multiplexed signals include a fourth signal of the second receiving mode generated from the second code word; and
- the demultiplexing spatially multiplexed signals includes demultiplexing of the first signal, the second signal, the third signal, and the fourth signal of the second receiver mode.

22. The non-transitory memory medium of claim 20 wherein, in the case of selection of the second receiving mode,
- the received spatially multiplexed signals include a fourth signal of the second receiver mode generated from a third code word with a third CRC attached thereto; and
- the demultiplexing spatially multiplexed signals includes demultiplexing of the first signal, the second signal, the third signal, and the fourth signal of the second receiving mode.

23. A non-transitory memory medium whose contents configure a receiving apparatus to perform a method, the method comprising:
- selecting a receiving mode from a plurality of receiving modes;
- in a case of selection of a first receiving mode of the plurality of receiving modes, demultiplexing received spatially multiplexed signals which include first, second, third and fourth signals of the first receiving mode generated from a first code word with a first cyclic redundancy check (CRC) attached;
- in a case of selection of a second receiving mode of the plurality of receiving modes, demultiplexing received spatially multiplexed signals which include first and second signals of the second receiving mode generated from a first code word of the second receiving mode with a first CRC attached, and third and fourth signals of the second receiving mode generated from a second code word of the second receiving mode with a second CRC attached; and
- decoding signals demultiplexed in the selected receiving mode.

24. A non-transitory memory medium whose contents configure a receiving apparatus to perform a method, the method comprising:
- selecting a receiving mode from a plurality of receiving modes;
- in a case of selection of a first receiving mode of the plurality of receiving modes, demultiplexing received spatially multiplexed signals which include first, second, third and fourth signals of the first receiving mode generated from a first code word with a first cyclic redundancy check (CRC) attached;
- in a case of selection of a second receiving mode of the plurality of receiving modes, demultiplexing received spatially multiplexed signals which include first and second signals of the second receiving mode generated from a first code word of the second receiving mode with a first CRC attached, a third signal of the second receiving mode generated from a second code word with a second CRC attached and a fourth signal of the second receiving mode generated from a third code word of the second receiving mode with a third CRC attached; and
- decoding signals demultiplexed in the selected receiving mode.

* * * * *